W. E. ROCKHILL.
METHOD AND APPARATUS FOR SIMULTANEOUSLY HARVESTING AND SPREADING HEMP.
APPLICATION FILED JUNE 8, 1916.
1,199,928.
Patented Oct. 3, 1916.
3 SHEETS—SHEET 1.
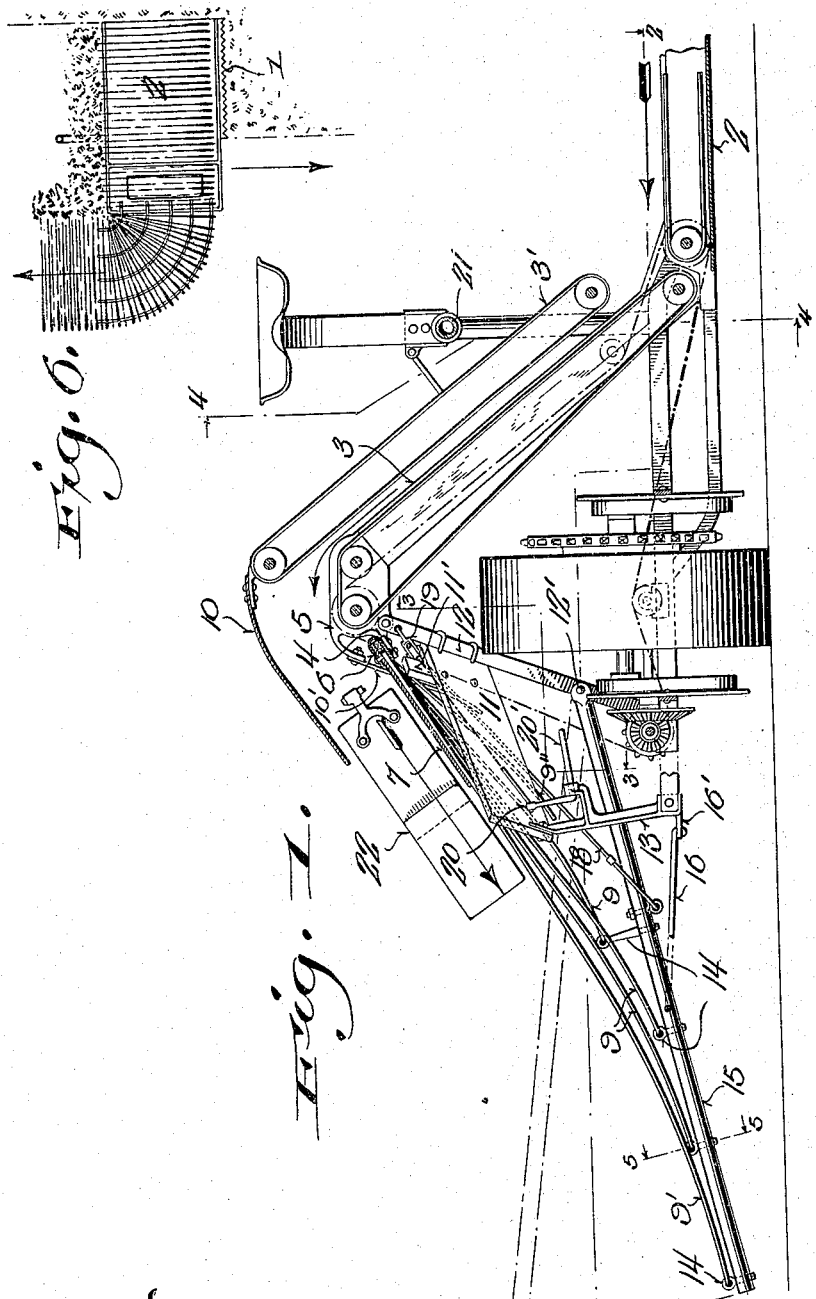

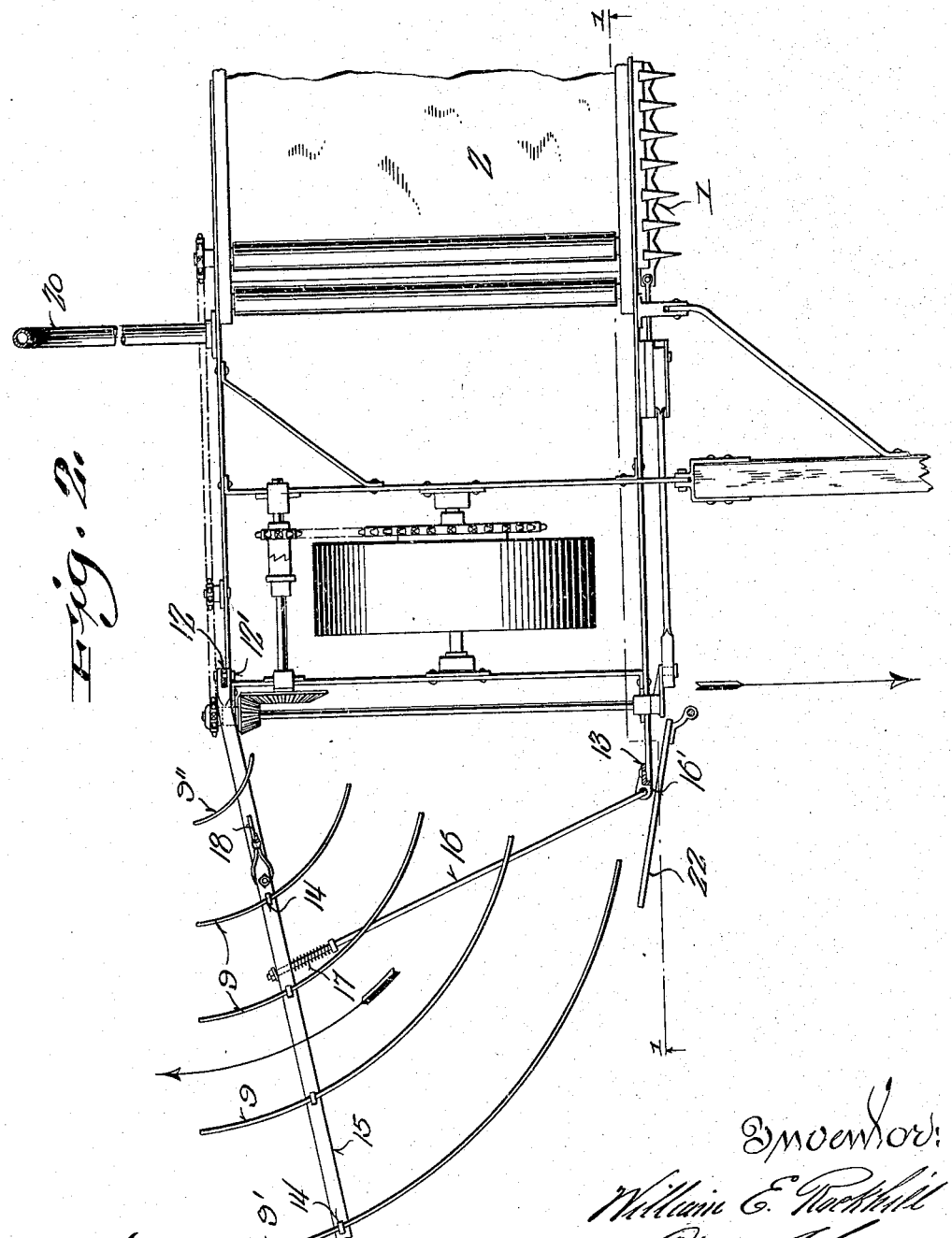

W. E. ROCKHILL.
METHOD AND APPARATUS FOR SIMULTANEOUSLY HARVESTING AND SPREADING HEMP.
APPLICATION FILED JUNE 8, 1916.
1,199,928. Patented Oct. 3, 1916.
3 SHEETS—SHEET 3.
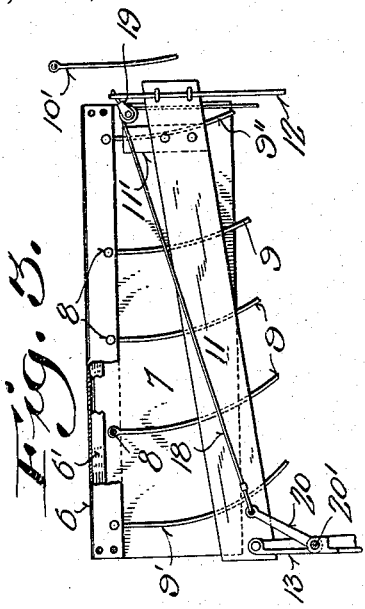
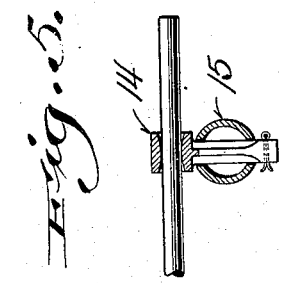
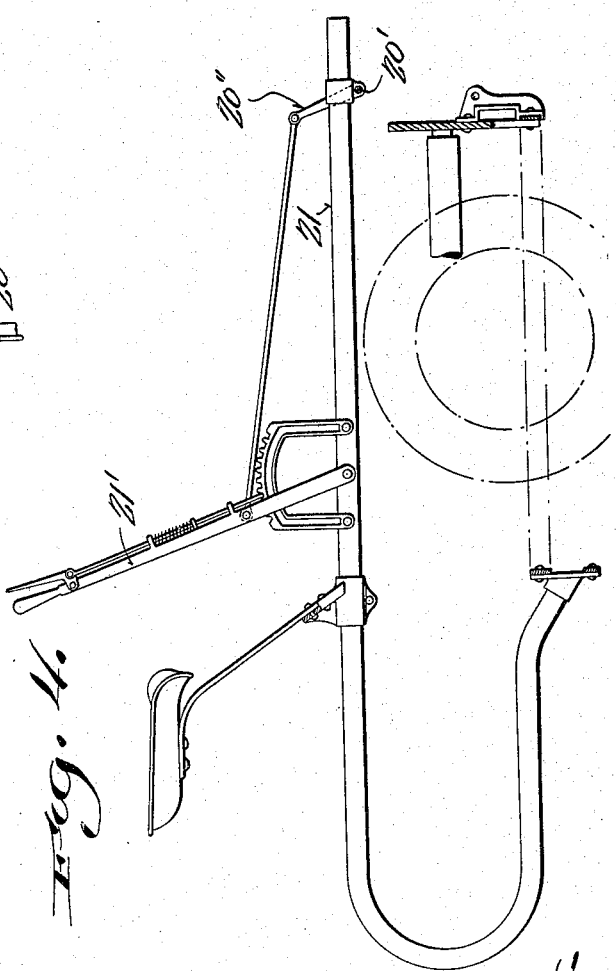

UNITED STATES PATENT OFFICE.

WILLIAM E. ROCKHILL, OF OCONOMOWOC, WISCONSIN.

METHOD AND APPARATUS FOR SIMULTANEOUSLY HARVESTING AND SPREADING HEMP.

1,199,928. Specification of Letters Patent. Patented Oct. 3, 1916.

Application filed June 8, 1916. Serial No. 102,380.

*To all whom it may concern:*

Be it known that I, WILLIAM E. ROCKHILL, a citizen of the United States, and resident of Oconomowoc, in the county of Waukesha and State of Wisconsin, have invented certain new and useful Improvements in Methods and Apparatus for Simultaneously Harvesting and Spreading Hemp; and I do hereby declare that the following is a full, clear, and exact description thereof.

My invention has for its primary object to provide a method and apparatus for simultaneously cutting and spreading hemp upon the stubble field in a uniform layer for retting purposes, the stalks of hemp, in a continuous operation, being first cut at the butts, causing them to fall with their heads rearwardly of the point of cut, following a conveying and elevating operation to a point of discharge upon a rearwardly curved and inclined cradle, whereby the butts of the stalks by their own weight are caused in their travel to describe approximately a quarter of a circle, while the heads of the stalks are positioned at an approximate pivotal point, whereby said stalks are caused to be laid in an even and uniform mass upon the stubble of a preceding cut and transversely of the same. By this arrangement the hemp is spread uniformly upon the ground as fast as cut, the said spread being as even as the growth, that is if the growth is heavy, the layer will be of a corresponding thickness, while, if light, a corresponding thin layer is distributed upon the stubble field, the operation being entirely automatic.

By employing a method and apparatus in accordance with my invention, a great saving of labor and expense in harvesting is effected due to the fact that what has previously required two distinct handlings can be done with my apparatus in one operation.

With the above objects in view the invention contemplates the employment of a skeleton cradle which can be readily attached to any of the well-known types of harvesters now in use. The cradle is preferably composed of a plurality of flexible rods fastened at their inner ends to a shank bar which is positioned at the discharge mouth of the harvester elevator. The cradle rods are rearwardly curved from their point of anchorage and are also downwardly inclined, the pitch of which incline is gradually increased from the front or butt-rods to the rear or head-rods in such form that the heavy butts of the stalks by their own weight will be caused to travel in a circular direction toward the rear of the apparatus, while the heads of said stalks constitute the pivot point about which the movement is effected. Hence the stalks are discharged upon the stubble of a preceding cut in a uniform thickness depending upon the density of the growth in a layer transversely of said cut. The cradle-rods at their free ends are slidably mounted upon a supporting bar, which is pivotally secured to the frame of the harvester and said supporting bar is under control of the driver or operator of the machine, whereby the discharge end of the cradle may be raised or lowered and locked in such position if desired to permit the cradle to pass over obstructions in the field or to facilitate travel upon the road to and from the field of operation.

With the above and other objects in view the invention consists in the method and certain apparatus having novel construction and combination of parts as set forth hereinafter with reference to the accompanying illustrations and subsequently claimed.

As exemplifying my invention Figure 1 of the drawings illustrates a front sectional elevation of a portion of a standard type of harvester equipped with a cradle attachment embodying the features of my invention, the section being indicated by line 1—1 of Fig. 2; Fig. 2, a plan sectional view of the same, the section being indicated by line 2—2 of Fig. 1; Fig. 3, a detailed sectional view looking toward the binder side of the machine showing the general construction of the cradle at its point of connection to the standard type of harvester, the section being indicated by line 3—3 of Fig. 1; Fig. 4, a cross-section through the machine illustrating the seat-supporting beam with detent mechanism for raising and lowering the free end of the cradle, the section being indicated by line 4—4 of Fig. 1; Fig. 5, a detailed sectional view illustrating means for slidably connecting the free ends of cradle-rods to a supporting bar, the section being indicated by line 5—5 of Fig. 1, and Fig. 6, a diagrammatic plan view of the apparatus illustrating the position of the hemp stalks assumed throughout their travel from the swath that is being cut to their point of discharge upon the preceding swath.

Referring by characters to the drawings, 1 represents the cutting bar of a harvester, 2 the receiving apron and 3, 3', the upper and lower elevator aprons which are spaced apart to form the usual throat, whereby the material cut is discharged to the binder table, not shown. All of this mechanism, together with the frame and bull-wheel, is the usual construction of a certain type of harvesters and forms no part of my invention.

When the machine is to be used for a hemp harvester, the binder mechanism, which is not shown, is removed. Secured to ears 4 that project from the head-plates 5 of the elevator frame is a U-shaped shank-bar 6. This shank-bar is provided with a filler strip 6' and has also extending therefrom a shield-plate 7. The shield-plate is suitably secured by bolts or rivets 8 that also pass through eyes that are formed in the ends of a series of intermediate cradle-rods 9, a front butt-rod 9', and a rear head-rod 9''. The shank-bar and the parts attached thereto are all slightly inclined downwardly from front to rear of the machine and the shield-plate so inclined is adapted to rest upon and form a solid surface at the base of the cradle-rods for the reception of the cut stalks of hemp which are discharged from the mouth of the elevator throat, the said mouth, as shown in Fig. 1, being positioned slightly above the cradle shank-bar. A hood 10 is also extended from the upper portion of the elevator mechanism for the purpose of deflecting the stalks of hemp as they are discharged.

In order to facilitate the free discharge of the stalks of hemp from the mouth of the elevator at their light head ends, I provide an auxiliary or guide rod 10' which guide-rod is bolted to an ear of the head-plate 5 and extends downwardly at a greater angle than the series of cradle-rods previously mentioned, this guide-rod being rearward of the entire series, as best shown in Fig. 3. The series of cradle-rods are preferably composed of comparatively delicate and flexible material and hence in order to provide an intermediate support, whereby the said series will be held against sagging, I employ an angularly positioned supporting board 11, one end of which board is secured by clips to the elevator brace-rod 12 and the opposite end to a standard 13 that projects from the ground frame of the harvester. Hence this supporting board serves as a gage or templet, upon which all of the cradle-rods rest and whereby the desired angle upon each is maintained. In order to support what is termed the head-rod 9'' of the cradle series, the board 11 carries a block 11', which block is sufficiently elevated to form a rest for the aforesaid head-rod.

As best shown in Figs. 2 and 3, the series of cradle-rods are curved from their inner secured ends rearwardly to form a series of substantially parallel guide rails for the cut stalks of hemp and, as previously stated, the rods are also inclined downwardly, the front or butt-rod 9' being at an inclination of considerably less pitch than the rear head-rod of the series 9'' and the intermediate rods of the series 9 are graduated in inclination from the first to the last. Thus the cradle forms a skeleton circular frame which is inclined toward its imaginary axis in somewhat spiral formation, the low plane of the spiral being at the line of discharge to the rear of said cradle-rods. Near the free ends of the flexible cradle-rods they pass through and are supported by eyed staple pins 14, as best shown in Fig. 5. The staple pins have shanks which extend through apertures in a tubular supporting bar 15 and the said pins are loosely confined by suitable cotter-pins, as shown. The head cradle-rod 9'', however, is not so confined to the supporting rod for the reason that its length is comparatively short, whereby the supporting board and its block 11' are sufficient to maintain it in the proper position. The tubular supporting bar 15 is secured to the frame-strut 12 of the harvester by a pivot-bolt 12'. Hence said bar can be raised or lowered from its point of support. This bar 15 is also braced by a strut-rod 16 having its forward end looped into an ear 16' that is fastened to the frame of the machine and its rear end passes through suitable apertures in the supporting bar and is confined by a nut and washer to oppose backward strain of the parts. The bar is capable of a slight play or forward movement upon the strut 16 and this movement is opposed by a coiled spring 17 which surrounds the strut between a collar fast thereon and the tubular supporting bar 15. The provision for play between the strut and the cradle-supporting bar 15, together with the sliding play between the cradle-bars and the eyed staple-pins is provided for the purpose of accommodating a somewhat skew movement with relation to the cradle bars that results when the supporting bar 15 is raised or lowered.

Referring to Fig. 1, when the machine is in operation, the cradle and its supporting-bar 15 are in the position shown with the extreme outer end of the aforesaid supporting-bar close to the ground or stubble. Should it be desired to lift the cradle to clear an obstruction or for the purpose of transporting the machine, the supporting-bar 15 is raised to the position as indicated in dotted lines, this movement being accomplished by the driver or operator from his seat. The means for controlling the cradle embodies a runner or cable 18 which is attached to the supporting bar 15 by an eye-bolt, as shown in Fig. 1. The cable is trained over a guide-sheave 19 that is suspended from the upper portion of the rear strut-bar 12 of the harvester frame, the said sheave being directly under the sheave-plate 7. The runner is trained over the sheave and is extended toward the front of the machine, as indicated in Figs. 1 and 3, the front end of said cable being connected to an arm 20 of a crank-rod 20'. This crank-rod is journaled in a bearing that forms part of the standard 13 and a second bearing that is fixed to the front end of the seat-supporting bar 21 of the machine. The opposite end of the crank-rod 20' carries another arm 20" which is connected to a detent-controlled lever 21' that is mounted upon the seat-supporting bar and positioned accessible to the operator's seat. It is manifest that, when the operator desires to raise or lower the cradle, the detent-controlled lever 21' may be manipulated and, if desired, locked in any position. It is also apparent that when the free ends of the cradle-rods are raised or lowered by action of the supporting-bar 15, they will flex from their point of anchorage at the shank-bar 6.

As shown in Figs. 1 and 2, when the binder mechanism and its table is removed for attaching the hemp-spreading cradle, the vibratory butt-board 22 is left intact and its functions are utilized for imparting a vibratory movement to the butt ends of the hemp, whereby they are insured to be put into motion as they are delivered from the mouth of the elevator so that they will, by gravity, travel downwardly and, in their travel, describe an arc of a circle which is approximately concentric with the front butt cradle-rod 9'.

While I have described one manner of constructing the cradle in all its details, it is obvious that such details may be varied within the scope of the skilled mechanic without departing from the spirit of my invention, the essential element being that the cradle is formed with a series of somewhat circular rods or ribs inclined spirally downward and rearwardly.

In view of the fact that hemp varies in height from, for example, six to ten feet, it is advisable, in some instances, to extend the looped portion of the seat-supporting bar a greater distance rearwardly than would ordinarily be required when the harvester is utilized for cutting grain and, with this object in view, I provide a looped seat-bar of extra length which can be substituted for the similar bars of standard length. Thus the longest stalks of hemp can be readily taken care of and even though the tasseled heads of the hemp would engage the rear looped end of the seat-bar, there is sufficient flexure in said heads to permit them to be drawn through as they travel from the floor apron of the harvester upward through the throat of the elevator aprons.

From the previous description the operation is manifest in that the stalks are severed by the cutting mechanism and their heads will drop rearward upon the apron of the platform in a uniform layer. The cut stalks will then travel to the binder side of the machine up through the elevators to the elevator throat and the headed ends will be guided downwardly upon the cradle by the guard rod 11 over which said headed ends travel. The butts or heavy ends of the hemp will readily drop by gravity upon the shield-plate 7 and to prevent delay in their travel the butt ends are subjected to the vibratory movement of the butt board 22, whereby they will not only be put into motion but will be evened up uniformly preparatory to their continuous travel over the front butt-rod 9' of the cradle series and, owing to the increased friction of the spreaded heads over the more concentrated butts of the stalks, the said butts will gain in momentum and complete their circular movement of 90° rearward while the light head ends will describe a short circular movement about an imaginary axis. Thus the flow of stalks will be continuous and uniform over the cradle and as the stalks drop from the ends of the cradle-rods they will be uniformly distributed upon the stubble of the preceding cut of the machine and transversely of said cut with respect to their length. Hence from the time the stalks are severed by the cutting apparatus they are kept in motion and are given a quarter turn, whereby they will rest upon the stubble in a layer as described at approximately a right angle to the position that they fall upon the binder platform and it follows that this even distribution of the cut stalks for retting upon the stubble ground, will be proportionately the same whether the crop is heavy or light. It is also manifest that, by utilizing the apparatus and the method described, the hemp is harvested and spread for retting in one operation, whereas, under ordinary conditions, two operations are required, resulting in expensive handling and, even under such conditions, the spreading of the hemp is more or less irregular as it depends upon the skill of the laborers who perform such work.

The diagrammatic view graphically illustrates the method of harvesting and spreading, showing the stalks during the entire operation beginning with cutting and ending with the spreading upon the stubble of the previous cut.

I claim:

1. A spreader attachment for harvesters comprising a shank-bar adapted to be affixed to the mouth of a harvester elevator, a series of approximately concentrically arranged curved bars extending from the shank-bar in a rearward direction, the bars being curved to form substantially a sector of a spiral from the shank-bar, means for supporting the free ends of the bars, and means for raising and lowering the curved bars.

2. A spreader attachment for harvesters comprising a shank-bar adapted to be affixed to the mouth of a harvester elevator, a series of approximately concentrically arranged curved bars extending from the shank-bar in a rearward direction, the bars being curved to form substantially a sector of a spiral from the shank-bar, and means for supporting the free ends of the bars.

3. A spreader attachment for harvesters comprising a shank-bar adapted to be affixed to the mouth of a harvester elevator, a series of approximately concentrically arranged curved bars extending from the shank-bar in a rearward direction, the bars being curved to form substantially a sector of a spiral from the shank-bar, and a supporting bar for the free ends of the cradle-bars.

4. A spreader attachment for harvesters comprising a shank-bar adapted to be affixed to the mouth of a harvester elevator, a series of approximately concentrically arranged curved bars extending from the shank-bar in a rearward direction, the bars being curved to form substantially a sector of a spiral from the shank-bar, a supporting bar for the free ends of the cradle-bars, and means for raising and lowering the supporting bar.

5. A spreader attachment for harvesters comprising a shank-bar adapted to be affixed to the mouth of a harvester elevator, a series of approximately concentrically arranged curved bars extending from the shank-bar in a rearward direction, the bars being curved to form substantially a sector of a spiral from the shank-bar, and a bar adapted to be hinged to the harvester frame for supporting the free ends of the cradle-bars, and means for raising and lowering said supporting bar.

6. A spreader attachment for harvesters comprising a shank-bar adapted to be affixed to the mouth of a harvester elevator, a series of approximately concentrically arranged curved bars extending from the shank-bar in a rearward direction, the bars being curved to form substantially a sector of a spiral from the shank-bar, means for supporting the free ends of the bars, and a vibratory agitator positioned in juxtaposition to one side of the series of cradle-bars.

In testimony that I claim the foregoing I have hereunto set my hand at Oconomowoc, in the county of Waukesha and State of Wisconsin, in the presence of two witnesses.

WILLIAM E. ROCKHILL.

Witnesses:
E. C. THEOBALD,
OTTO C. PETERS.